United States Patent
Li et al.

(10) Patent No.: US 11,086,174 B2
(45) Date of Patent: Aug. 10, 2021

(54) DISPLAY SUBSTRATE, DISPLAY MODULE AND CONTROL METHOD

(71) Applicant: Xiamen Tianma Micro-Electronics Co.,Ltd., Xiamen (CN)

(72) Inventors: Donghua Li, Xiamen (CN); Xiaoli Wei, Xiamen (CN); Xiufeng Zhou, Xiamen (CN); Guochang Lai, Xiamen (CN); Shumao Wu, Xiamen (CN); Boping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 1 day.

(21) Appl. No.: 16/815,800

(22) Filed: Mar. 11, 2020

(65) Prior Publication Data
US 2021/0181559 A1    Jun. 17, 2021

(30) Foreign Application Priority Data
Dec. 17, 2019 (CN) .......................... 201911303631.X

(51) Int. Cl.
*G02F 1/1345* (2006.01)
*G02F 1/1339* (2006.01)
(Continued)

(52) U.S. Cl.
CPC ........ *G02F 1/13452* (2013.01); *G02F 1/1339* (2013.01); *G02F 1/1368* (2013.01);
(Continued)

(58) Field of Classification Search
CPC . G02F 1/13452; G02F 1/136204; G09G 3/20; G09G 2300/0421; G09G 2300/0426; G09G 2330/06
See application file for complete search history.

(56) References Cited

U.S. PATENT DOCUMENTS 6,100,949 A * 8/2000 Kim .................. G02F 1/136204
349/40
6,104,449 A * 8/2000 Takahashi ......... G02F 1/136204
349/40
(Continued)

FOREIGN PATENT DOCUMENTS

CN      104849881 A      8/2015
CN      108681116 A      10/2018
(Continued)

*Primary Examiner* — Priyank J Shah
(74) *Attorney, Agent, or Firm* — Anova Law Group, PLLC

(57) ABSTRACT

A display substrate, a display module and a control method are provided in the present disclosure. The display substrate includes a first substrate and a second substrate. The first substrate includes a base substrate, conductive pads, a first switch unit group electrically connected to the conductive pads and signal wires, and a second switch unit group electrically connected to the conductive pads. The display substrate includes a substrate detection phase where all second switch units are cutoff, all first switch units are conducting, and an external detection device input a first detection signal to the substrate through the conductive pads and all first switch units. When the first switch unit group is conducting, the conductive pads are used for substrate detection, and when the second switch unit group is cutoff, the conductive pads in a same pad region are connected each other to be multiplexed as electrostatic conductive pads.

18 Claims, 7 Drawing Sheets

(51) Int. Cl.
*G02F 1/1368* (2006.01)
*G09G 3/20* (2006.01)
*G02F 1/1362* (2006.01)

(52) U.S. Cl.
CPC ......... *G02F 1/136204* (2013.01); *G09G 3/20* (2013.01); *G09G 2300/0426* (2013.01)

(56) References Cited

U.S. PATENT DOCUMENTS

| | | | | |
|---|---|---|---|---|
| 9,000,796 | B2 * | 4/2015 | Shirouzu | G02F 1/136204 324/760.02 |
| 2001/0050835 | A1 * | 12/2001 | Uchida | G02F 1/136204 361/111 |

FOREIGN PATENT DOCUMENTS

| | | | |
|---|---|---|---|
| CN | 109116649 | A | 1/2019 |
| CN | 109786363 | A | 5/2019 |
| CN | 110032007 | A | 7/2019 |

\* cited by examiner

DISPLAY SUBSTRATE, DISPLAY MODULE AND CONTROL METHOD

CROSS-REFERENCE TO RELATED APPLICATION

This application claims the priority of Chinese Patent Application No. 201911303631.X, filed on Dec. 17, 2019, the content of which is incorporated herein by reference in its entirety.

TECHNICAL FIELD

The present disclosure generally relates to the field of display technology and, more particularly, relates to a display substrate, a display module and a control method thereof.

BACKGROUND

The display industry has developed rapidly for decades from the cathode ray tube (CRT) era to the liquid crystal era, and then to current organic light-emitting diode (OLED) era. The display industry is closely related to people's daily lives. Devices from conventional mobile phones, tablets, TVs, and PCs, to current smart wearable devices, virtual reality (VR), and the like, are all related to the display technology.

The display panel has a growing trend toward narrow frame design. Certain peripheral components, such as a conductive pad structure for detection, an electrostatic conductive pad structure for conducting static electricity, are required to be disposed at the frame region of the display panel. The presence of such peripheral components may prevent the frame of the display panel from being further narrowed.

Therefore, there is a need to intelligently arrange the space of the frame region of the display panel to further narrow the frame of the display panel.

SUMMARY

One aspect of the present disclosure provides a display substrate. The display substrate includes a display region and a non-display region surrounding the display region, and a first substrate and a second substrate opposite to the first substrate. The non-display region includes a first frame region; the first frame region includes a binding region and a pad region; and the pad region is at least at one side of the binding region along a first direction. The first substrate includes a base substrate, and a plurality of conductive pads disposed at a side of the base substrate facing the second substrate, where the plurality of conductive pads is at the pad region. The first substrate further includes a first switch unit group at the first frame region, where the first switch unit group includes a plurality of first switch units, first terminals of all first switch units are electrically connected to all conductive pads in a one-to-one correspondence respectively, and second terminals of all first switch units are electrically connected to different signal wires in the first substrate respectively. The first substrate further includes a second switch unit group at the first frame region, where the second switch unit group includes a plurality of second switch units, first terminals of all second switch units are electrically connected to all conductive pads in a one-to-one correspondence respectively, and second terminals of all second switch units electrically connected to the conductive pads at a same pad region are connected with each other. The first substrate includes a substrate detection phase. At the substrate detection phase, a conduction signal is provided to gates of all first switch units and a cutoff signal is provided to gates of all second switch units, by an external detection device, thereby enabling all second switch units to be cutoff and all first switch units to be conducting; and the display substrate is configured to receive a first detection signal inputted by the external detection device through the conductive pads and all first switch units.

Another aspect of the present disclosure provides a display module. The display module includes the display substrate provided by the present disclosure, a drive chip and a conductive structure. The drive chip is bound to the binding region; and the second substrate includes an electrostatic shielding layer electrically connected to the conductive pads through the conductive structure. The display module includes an electrostatic conduction phase. At the electrostatic conduction phase, the conductive pads are multiplexed as electrostatic conduction pads, all first switch units are cutoff, all second switch unit are conducting, and all conductive pads at the same pad region are connected with each other.

Another aspect of the present disclosure provides a control method of the display module provided by the present disclosure. The control method includes a control method at an electrostatic conduction phase. At the electrostatic conduction phase, the drive chip transmits the cutoff signal to all first switch units, thereby enabling all first switch units to be cutoff; and simultaneously, the drive chip transmits the conduction signal to all second switch units, thereby enabling all second switch units to be conducting and also enabling all conductive pads at the same pad region to be connected to each other and to be multiplexed as electrostatic conductive pads.

Other aspects of the present disclosure can be understood by those skilled in the art in light of the description, the claims, and the drawings of the present disclosure.

BRIEF DESCRIPTION OF THE DRAWINGS

Drawings incorporated in the specification and forming a part of the specification demonstrate the embodiments of the present disclosure and, together with the specification, describe the principles of the present disclosure.

DETAILED DESCRIPTION

Figure 1:
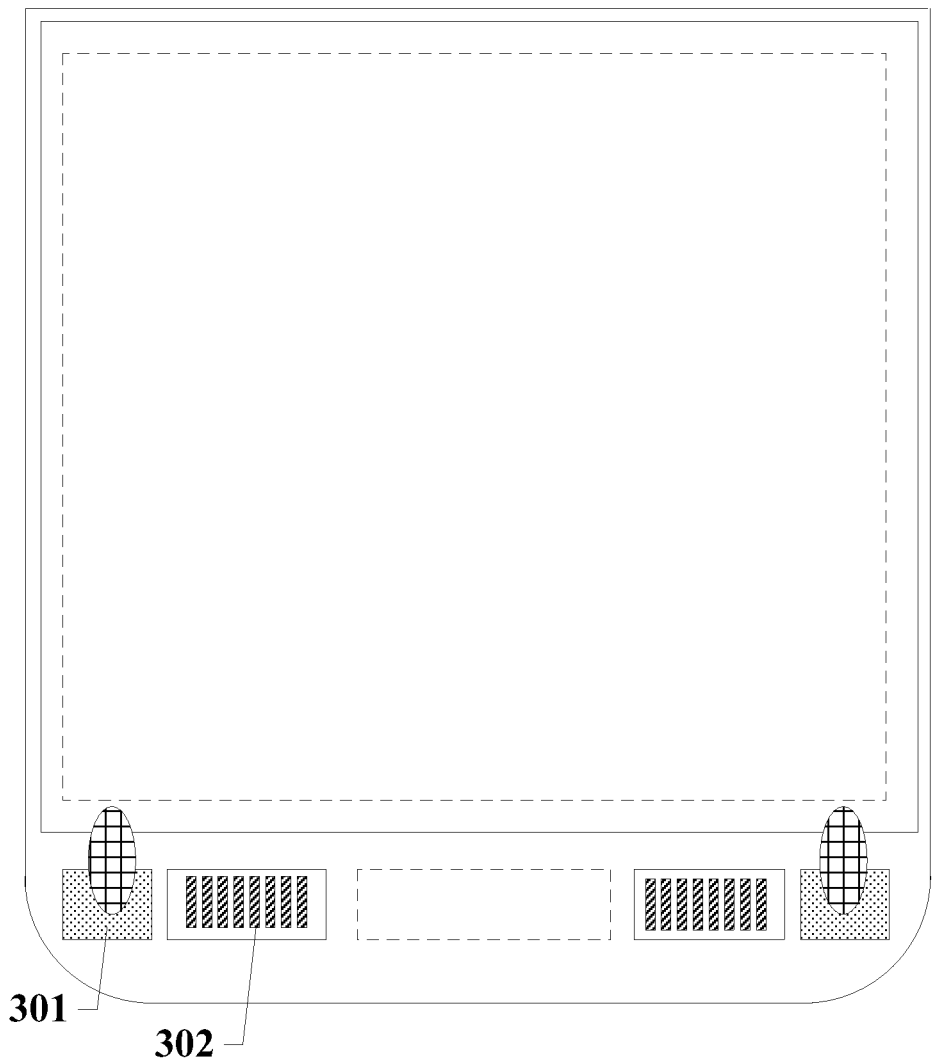
FIG. 1 illustrates a top view of a display substrate provided in an existing technology.

Various embodiments of the present disclosure may be described in detail with reference to the drawings. It should be noted that, unless specifically stated otherwise, the relative arrangement of components and steps, numerical expressions, and numerical values set forth in the embodiments do not limit the scope of the present disclosure.

The following description of at least one embodiment may be merely illustrative and may be in no way intended to limit the present disclosure and its application or use.

Techniques, methods, and equipment known to those skilled in the art may not be discussed in detail, but where appropriate, the techniques, methods, and equipment should be considered as a part of the description.

In the examples shown and discussed herein, any specific value should be construed as exemplary merely and not as a limitation. Therefore, other examples of the embodiments may have different values.

It should be noted that similar reference numerals and letters indicate similar items in the following drawings. Therefore, once an item is defined in one drawing, it does not need to be discussed further in subsequent drawings.

FIG. 1 illustrates a top view of a display substrate provided in an existing technology. Referring to FIG. 1, an electrostatic conductive pad 301 and a detective pad 302 may be disposed at a lower frame position of a display substrate 300. The electrostatic conductive pad 301 may be configured to conduct static electricity existing in the display substrate 300 to the outside of the display substrate 300, and the detective pad 302 may be configured to perform detection on the display substrate. The electrostatic conductive pad 301 and the detective pad 302 may be disposed side by side at the frame region of the display substrate, so that the lower frame position of the display substrate may not be further reduced, thereby limiting the frame of the display substrate to be further narrowed.

Therefore, the technical problem to be solved by the present disclosure is to provide a display substrate, a display module, and a control method thereof, where a conductive pad for detection is multiplexed as an electrostatic conductive pad, which may be advantageous to further reduce the frame width of the display substrate and the display module, thereby better implementing the narrow frame design of the display substrate and the display module.

Figure 2:
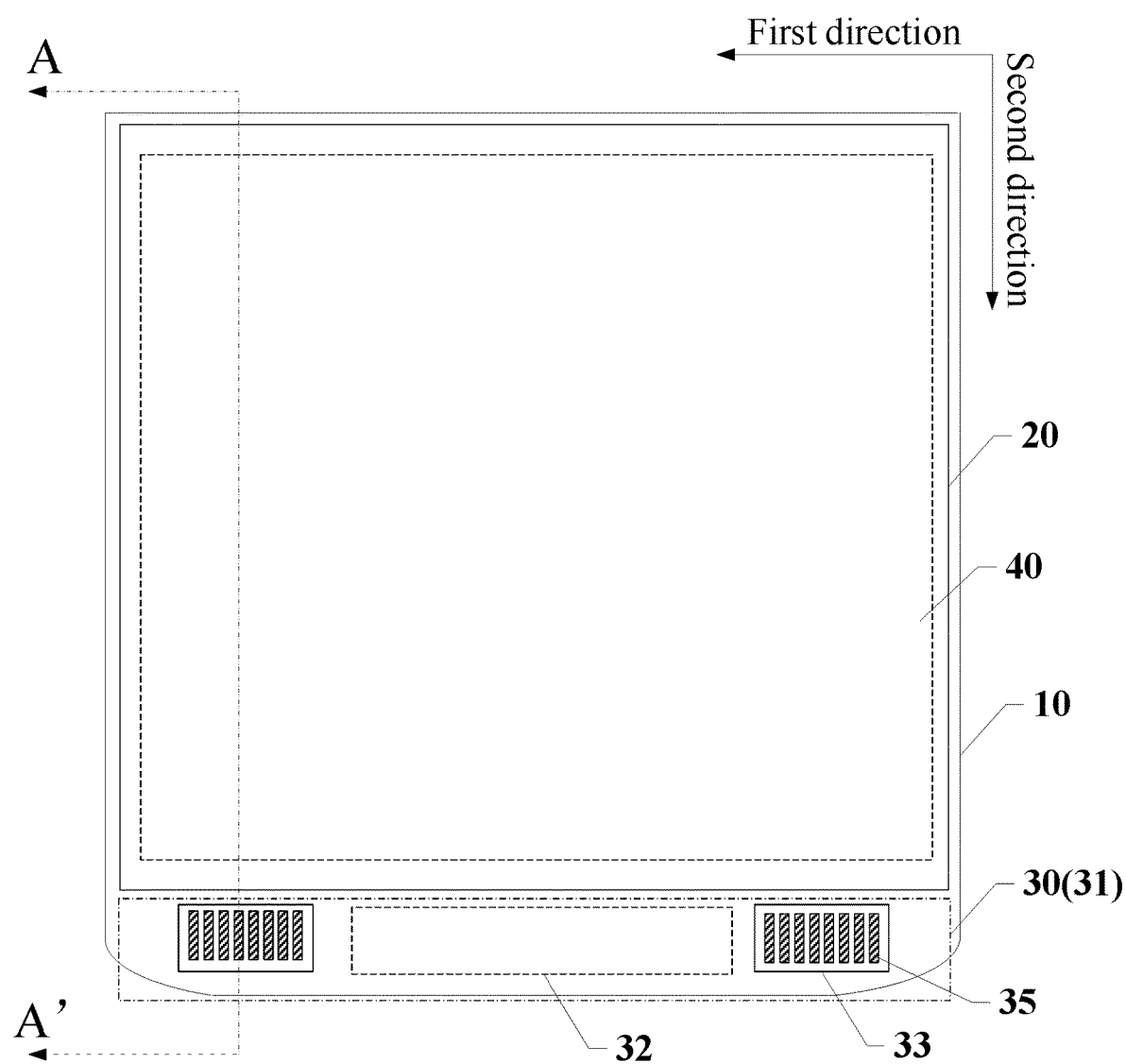
FIG. 2 illustrates a top view of a display substrate according to the embodiments of the present disclosure.
Figure 3:
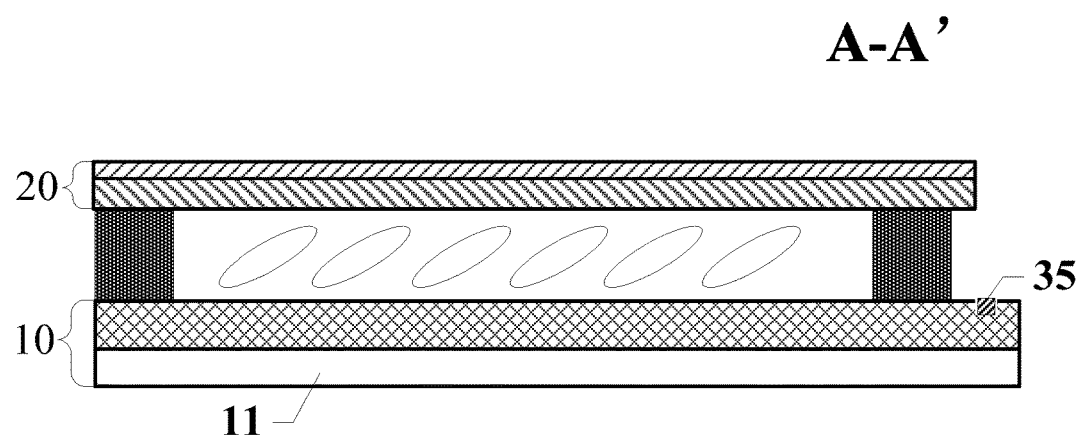
FIG. 3 illustrates a cross-sectional view along an AA' line of a display substrate according to the embodiment in FIG. 2.
Figure 4:
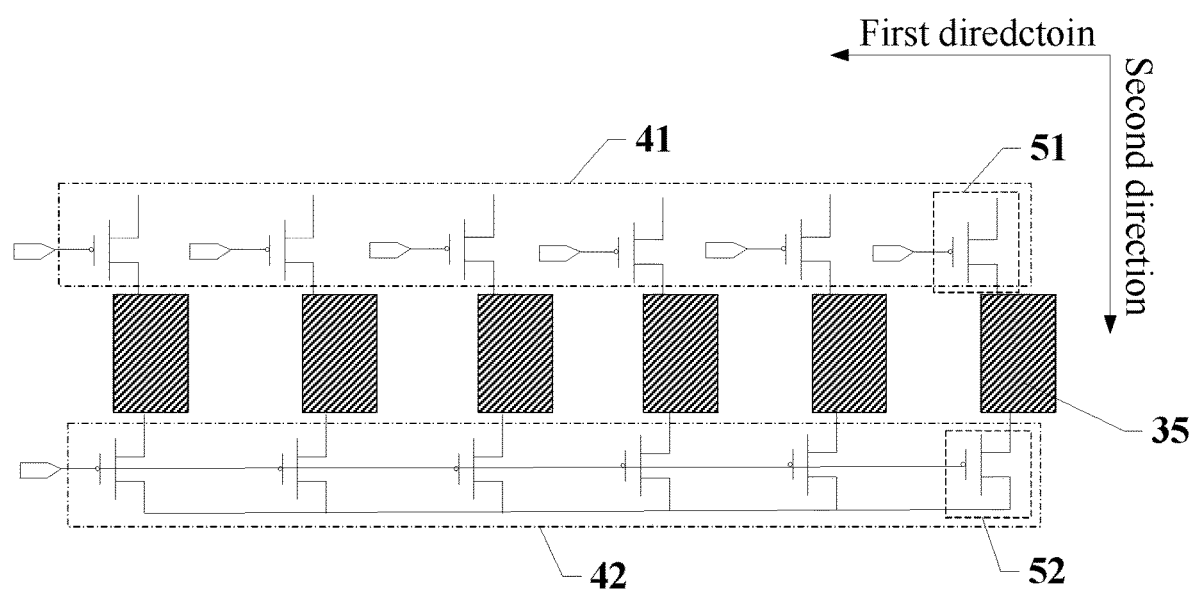
FIG. 4 illustrates a connection relationship schematic of conductive pads corresponding to a pad region according to the embodiment in FIG. 2.

FIG. 2 illustrates a top view of a display substrate according to the embodiments of the present disclosure; FIG. 3 illustrates a cross-sectional view along an AA' line of the display substrate according to the embodiment in FIG. 2; and FIG. 4 illustrates a connection relationship schematic of conductive pads corresponding to a pad region according to the embodiment in FIG. 2. Referring to FIGS. 2-4, the present disclosure may provide a display substrate 100, including a display region 40 and a non-display region 30 surrounding the display region 40. The non-display region 30 may include a first frame region 31, and the first frame region 31 may include a binding region 32 and a pad region 33. The pad region 33 may be at least at one side of the binding region 32 along a first direction. The display substrate 100 may include a first substrate 10 and a second substrate 20, which are opposite to each other. The first substrate 10 may include:

a base substrate 11;

a plurality of conductive pads 35 disposed at a side of the base substrate 11 facing the second substrate 20, where the conductive pads 35 may be at the pad region 33;

a first switch unit group 41 at the first frame region 31, where the first switch unit group 41 may include a plurality of first switch units 51, first terminals of all first switch units 51 may be electrically connected to conductive pads 35 in a one-to-one correspondence, and second terminals of all first switch units 51 may be electrically connected to different signal wires in the first substrate 10; and a second switch unit group 42 at the first frame region 31, where the second switch unit group 42 may include a plurality of second switch units 52, first terminals of all second switch units 52 may be electrically connected to conductive pads 35 in a one-to-one correspondence, and second terminals of the second switch units 52, which may be electrically connected to the conductive pads 35 at a same pad region 33, may be connected with each other.

The display substrate 100 may include a substrate detection phase. At the substrate detection phase, an external detection device may provide a conduction signal to gates of all first switch units 51 and also provide a cutoff signal to gates of all second switch units 52, thereby enabling all second switch units 52 to be cutoff and all first switch units 51 to be conducting; and the external detection device may input a first detection signal to the display substrate through the conductive pads 35 and all first switch units 51.

It should be noted that FIGS. 2-3 may merely exemplarily illustrate a relative position relationship between the first substrate 10 and the second substrate 20, which may not represent the actual size and quantity. In FIG. 2, in order to distinguish the first substrate from the second substrate, the width of the second substrate along the first direction is less than the width of the first substrate along the first direction for illustration; in fact, the widths of the first substrate and the second substrate along the first direction are same. Furthermore, the structure of the display substrate 100 may not only include parts illustrated in the drawings, but also include other technical features known in the existing technology for implementing display functions, such as pixel units in the display region 40, gate drive units (not shown) in the non-display region 30, and the like, which may not be illustrated or described in one embodiment in detail according to the embodiments of the present disclosure.

For example, referring to FIGS. 2-4, in the display substrate 100 provided in the present disclosure, the first frame region 31 of the display substrate 100 may include the binding region 32 and the pad region 33. The display substrate 100 may include the first substrate 10 and the second substrate 20, which are opposite to each other. The first substrate 10 may include the plurality of conductive pads 35 disposed at the side of the base substrate 11 facing the second substrate 20, where the conductive pads 35 may be at the pad region 33. The present disclosure provides the first switch unit group 41 which may be respectively and electrically connected to the conductive pads 35 and the signal wires in the first substrate 10, and also provides the second switch unit group 42 which may be electrically connected to the conductive pad 35. When the first switch unit group 41 is conducting and the second switch unit group 42 is cutoff, the conductive pads 35 may be used to input the first detection signal to the substrate to implement the substrate detection. When the second switch unit group 42 is conducting and the first switch unit group 41 is cutoff, the conductive pads 35 at a same pad region 33 may be connected with each other to be multiplexed as electrostatic conductive pads to conduct out static electricity in the display substrate 100 and the display module. In such way, the electrostatic conductive pads may not be required to be separately disposed at the first frame region 31 of the display substrate 100, and the conductive pads 35 of the pad region 33 on the display substrate 100 may be multiplexed as the electrostatic conductive pads. Therefore, the space of the first frame region 31 may be efficiently utilized and saved, and the width of the first frame region 31 may be further reduced while the substrate detection and the electrostatic conduction are implemented, which may be more advantageous to implement the narrow frame design of the display substrate 100.

It should also be noted that the display substrate 100 in the present disclosure may refer to a structure when the drive chip has not been bound to the binding region 32 during the production process of the display device. Before binding the drive chip, the detection may be performed on the display substrate 100 through an external device and the conductive pads 35 to determine whether the display substrate 100 is abnormal, and only the display substrate 100 with normal substrate inspection may further be bound to the drive chip, which may be advantageous to improve the production yield of display products.

In an optional embodiment, referring to FIG. 2, the pad regions 33 may be at two sides of the binding region 32 along the first direction, and the conductive pads 35 may be symmetrically disposed at two sides of the binding region 32 along the first direction.

For example, the pad regions 33 may be disposed at two sides of the binding region 32, and also the padding pads 35 may be symmetrically disposed at two sides of the binding region 32 in the present disclosure. In such way, when the conductive pads 35 are electrically connected to the signal wires in the first substrate 10 through the first switch unit group 41, the conductive pads 35 may be electrically connected to adjacent signal wires on two sides of the first substrate 10 along the first direction. For example, in the viewing angle shown in FIG. 2, the conductive pads 35 on a left side may be electrically connected to the signal wires on a left half of the display substrate 100, and the conductive pads 35 on a right side may be electrically connected to the signal wires on a right half of the display substrate 100, thereby avoiding a large quantity of windings, which may be advantageous to simplify the wiring complexity on the display substrate 100 and improve the production efficiency of the display substrate 100.

It should be noted that, in some embodiments of the present disclosure, only one pad region 33 may be disposed at the first frame region 31 of the display substrate 100, and the quantity of the pad regions 33 may not be limited according to the embodiments of the present disclosure.

In an optional embodiment, referring to FIG. 4, the first switch unit group 41 and the second switch unit group 42 may be respectively at two sides of the conductive pads 35 along a second direction, where the first direction may intersect the second direction.

It should be noted that the embodiment shown in FIG. 4 may be an enlarged view of the first frame region 31 at the display substrate 100 and may not represent actual dimensions of the first switch unit group 41, the second switch unit group 42, and the conductive pads 35. In one embodiment, the first switch unit group 41 and the second switch unit group 42 may be respectively disposed at two sides of the conductive pads 35 along the second direction, which may be convenient for the first switch unit group 41 to be electrically connected to the conductive pads 35 and signal wires, and also be convenient for the second switch unit group 42 to be electrically connected to the conductive pads 35. In such way, the first switch unit group 41, the second switch unit group 42, and the conductive pads 35 may be reasonably arranged in the first frame region 31, thereby simplifying the wiring complexity of the first frame region 31 while implementing the narrow frame of the first frame region 31.

Figure 5:
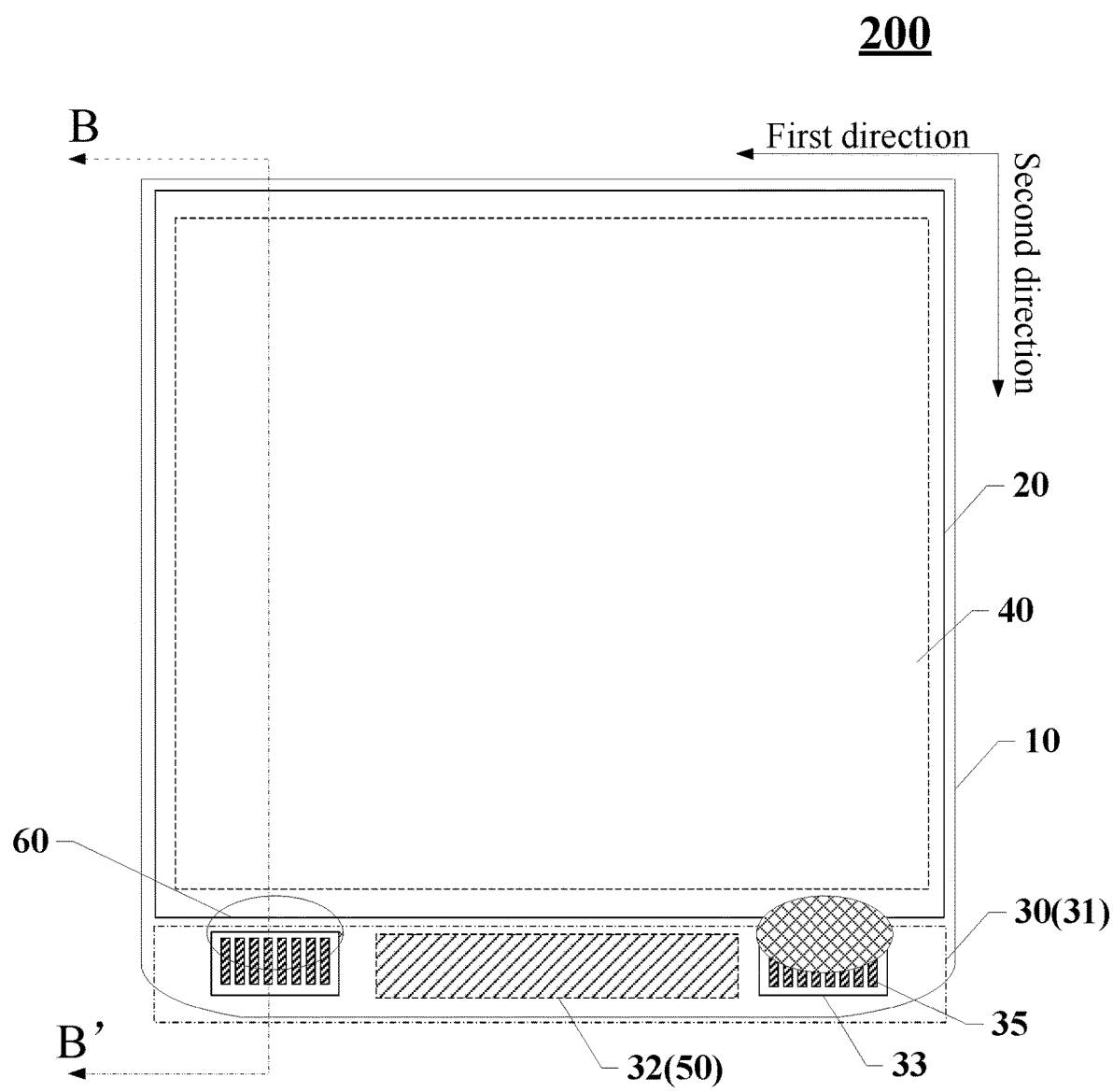
FIG. 5 illustrates a top view of a display module according to the embodiments of the present disclosure.
Figure 6:
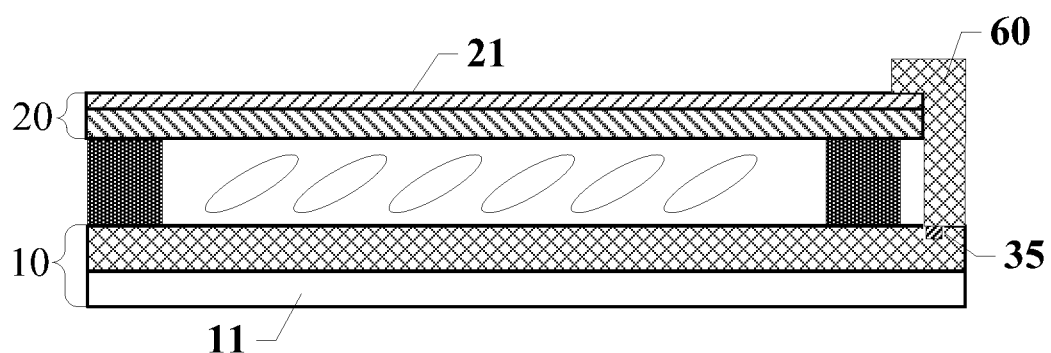
FIG. 6 illustrates a cross-sectional view along a BB' line of a display module according to the embodiment in FIG. 5.

Based on the same concept, the present disclosure further provides a display module 200. FIG. 5 illustrates a top view of the display module 200 according to the embodiments of the present disclosure. FIG. 6 illustrates a cross-sectional view along a BB' line of the display module 200 according to the embodiment in FIG. 5. The display module 200 may include the display substrate 100 provided in the above-mentioned embodiments. Referring to FIGS. 5-6, the display module 200 may further include a drive chip 50 and a conductive structure 60; the drive chip 50 may be bound to the binding region 32; the second substrate 20 may include an electrostatic shielding layer 21 which may be electrically connected to the conductive pads 35 through the conductive structure 60.

The display module 200 may include an electrostatic conduction phase. At the electrostatic conduction phase, the conductive pads 35 may be multiplexed as the electrostatic conduction pads, all first switch units 51 may be cutoff, all second switch units 52 may be conducting, and all conductive pads 35 at a same pad region 33 may be connected with each other.

It should be noted that the display module 200 provided in the embodiments of the present disclosure may refer to the structure where after the display substrate 100 provided in the embodiments of the present disclosure passes the substrate detection, the drive chip 50 may be bound to the binding region 32 of the display substrate 100, and the electrostatic shielding layer 21 at the second substrate 20 and the conductive pads 35 at the first substrate 10 may be electrically connected through the conductive structure 60.

For example, referring to FIGS. 4-6, the electrostatic shielding layer 21 at the second substrate 20 may be electrically connected to the conductive pads 35 at the first substrate 10 through the conductive structure 60 in the display module 200 provided in the embodiments of the present disclosure. At the electrostatic conduction phase, the conductive pads 35 at the first substrate 10 may be multiplexed as the electrostatic conduction pads, and all second switch units 52 may be conducting. Since the second terminals of all second switch units 52 electrically connected to the conductive pads 35 in a same pad region 33 are connected, when the second switch units 52 are conducting, the conductive pads 35 at the same pad region 33 may be electrically connected to each other, thereby forming an equipotential integrated structure for transmitting static electricity. That is, the electrostatic conductive pads may not be required to be separately disposed at the first frame region 31 for the display module 200, and conductive pads 35 at the first frame region 31 may be multiplexed as the electrostatic conductive pads. Therefore, the space occupied by the static conductive pads separately disposed at the first frame region 31 may be saved, which may be advantageous to further reduce the frame region while implementing reliable electrostatic conduction and be more advantageous to implement the narrow frame design.

Figure 7:
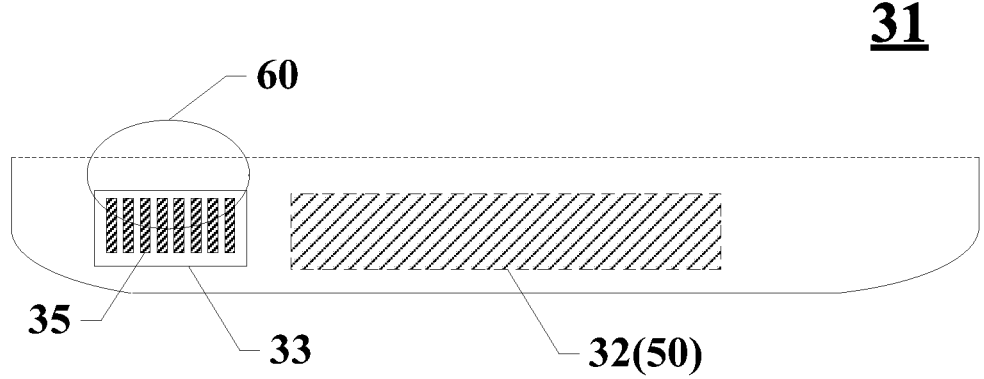
FIG. 7 illustrates a top view of a first frame region in a display module according to the embodiments of the present disclosure.

In an optional embodiment, referring to FIG. 7, FIG. 7 illustrates a top view of the first frame region 31 in the display module 200 according to the embodiments of the present disclosure, the quantity of the conductive structures 60 may be one, and the quantity of the pad regions 33 may be one. The orthographic projection of the conductive structure 60 on a plane of the base substrate may respectively overlap the orthographic projections of all conductive pads 35 in the pad region 33 on the plane of the base substrate.

For example, referring to FIG. 7, in the display module 200, when the conductive pads 35 are multiplexed as the electrostatic conductive pads, the conductive structure 60 may be used to electrically connect the electrostatic shielding layer 21 at the second substrate 20 with the conductive pads 35 at the first substrate 10, which may conduct out the static electricity in the display module 200 to prevent the static electricity from affecting the normal display of the display module 200. When the orthographic projection of the conductive structure 60 on the plane of the base substrate respectively overlaps the orthographic projections of all conductive pads 35 in the pad region 33 on the plane of the base substrate, compared with the manner that the orthographic projection of the conductive structure 60 on the plane of the base substrate overlaps the orthographic projections of a part of the conductive pads 35, it may be beneficial to increase the contact area between the conductive structure 60 and the conductive pads 35, thereby improving the reliability of the electrical connection between the conductive structure 60 and the conductive pads 35 and also improving the reliability of the electrostatic conduction.

Figure 8:
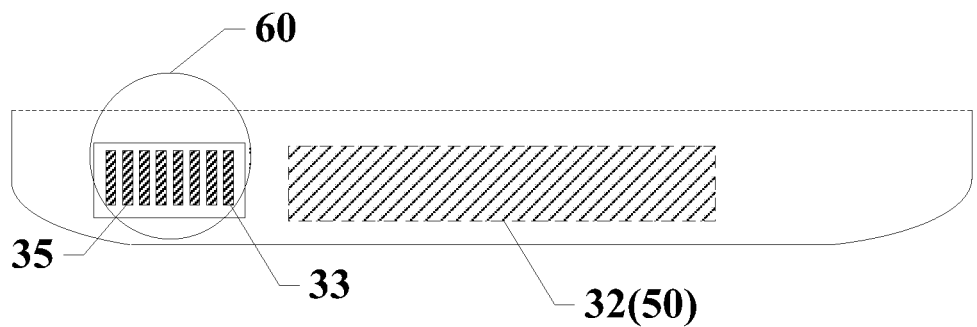
FIG. 8 illustrates another top view of a first frame region in a display module according to the embodiments of the present disclosure.

In an optional embodiment, referring to FIG. 8, FIG. 8 illustrates another top view of the first frame region 31 in the display module 200 according to the embodiments of the present disclosure. The orthographic projection of the conductive structure 60 on the plane of the base substrate may cover the orthographic projections of all conductive pads 35 in the pad region 33 on the plane of the base substrate.

For example, the conductive structure 60 in one embodiment may completely cover all conductive pads 35 in a same pad region 33, which may further increase the contact area between the conductive structure 60 and the conductive pads 35, thereby further improving the reliability of the electrical connection between the conductive structure 60 and all conductive pads 35 and the reliability of the electrostatic conduction, and further preventing the static electricity from affecting the normal display of the display module 200.

Figure 9:
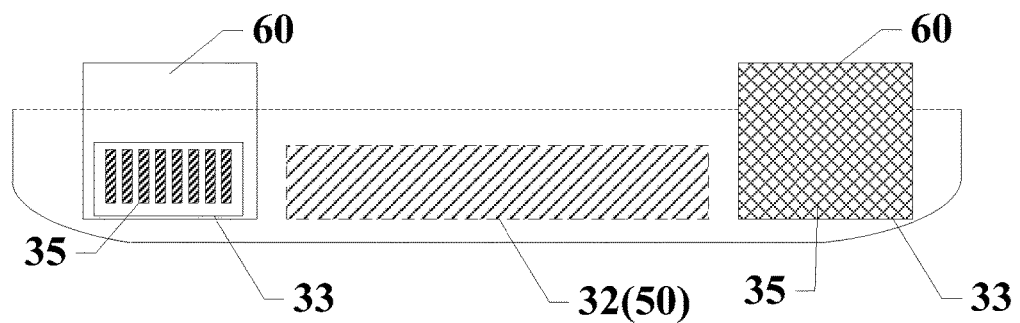
FIG. 9 illustrates another top view of a first frame region in a display module according to the embodiments of the present disclosure.

In an optional embodiment, referring to FIG. 9, FIG. 9 illustrates another top view of the first frame region 31 in the display module 200 according to the embodiments of the present disclosure. In one embodiment, the quantity of the conductive structures 60 may be two, and the quantity of the pad regions 33 may be two. Two pad regions 33 may be at two sides of the binding region 32 along the first direction.

The conductive structures 60 and the pad regions 33 may be disposed at a one-to-one correspondence. The orthographic projection of the conductive structure 60 on the plane of the base substrate may respectively overlap the orthographic projections of all conductive pads 35 in the pad region 33 corresponding to the conductive structure 60 on the plane of the base substrate.

For example, referring to FIG. 9, when the quantity of the pad regions 33 is two in the present disclosure, two groups of the conductive structures 60 may be disposed correspondingly, such that the conductive structures 60 may be respectively connected to the conductive pads 35 in the pad regions 33. In such way, it is equivalent that two groups of the electrostatic conduction paths are introduced in the display module 200, thereby enabling the static electricity in the display module 200 to be conducted to the external from two groups of he electrostatic conduction paths, which may be more advantageous to prevent the static electricity from affecting the normal display of the display module 200. Meanwhile, when the orthographic projection of the conductive structure 60 on the plane of the base substrate respectively overlaps the orthographic projections of all conductive pads 35 in the corresponding pad region 33 on the plane of the base substrate, it may be advantageous to improve the reliability of the electrical connection between the conductive structure 60 and the conductive pads 35. In other embodiments of the present disclosure, the conductive structure 60 may further cover all conductive pads 35 in the corresponding pad region 33, which may increase the contact area between the conductive structure 60 and the conductive pads 35, thereby further improving the reliability of the electrical connection between the conductive structure 60 and the conductive pads 35 and ensuring the reliable conduction of static electricity.

In an optional embodiment, the conductive structure 60 in the display module 200 provided in the present disclosure may be a colloid doped with conductive particles. When the conductive structure 60 is configured as a colloidal structure, the electrical connection between the electrostatic shielding layer 21 at the second substrate 20 and the conductive pad 35 at the first substrate 10 may be implemented by a simple dispensing process. In addition, since the colloid is doped with conductive particles, the conductive structure 60 may have the function of conducting electricity, thereby implementing the electrical connection between the electrostatic shielding layer 21 and the conductive pad 35.

Optionally, the conductive particles doped in the colloid may include silver or copper, and obviously, may be other metal particles with desirable conductive properties, which may not be limited herein according to the embodiments of the present disclosure. In an implementation, the conductive structure 60 may be, for example, a conductive silver colloid, a conductive copper colloid, and the like.

Figure 10:
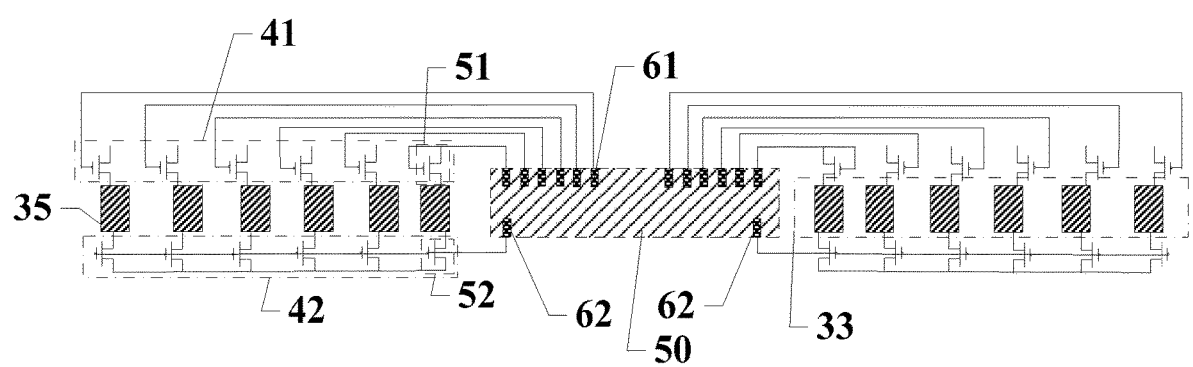
FIG. 10 illustrates a connection schematic between a drive chip and a first switch unit group according to the embodiments of the present disclosure.

In an optional embodiment, FIG. 10 illustrates the connection schematic between the drive chip 50 and the first switch unit group 41 in the display module 200 according to the embodiments of the present disclosure. The drive chip 50 may include a plurality of first control terminals 61, and gate electrodes of all first switch units 51 may be electrically connected to the first control terminals 61 in a one-to-one correspondence.

The display module 200 may include a module detection phase. At the module detection phase, the drive chip 50 may transmit a conduction control signal to the gate electrode of one first switch unit 51 and also transmit a cutoff control signal to the gate electrodes of other first switch units 51 through the first control terminals 61, which may enable one first switch unit 51 to be conducting and other first switch units 51 to be cutoff; and the signal of a signal wire electrically connected to the first switch unit 51 may be read through the conductive pad 35 and the conducting first switch unit 51.

For example, referring to FIG. 10, the gate electrodes of all first switch units 51 may be electrically connected to the first control terminals 61 at the drive chip 50 in the one-to-one correspondence, and the drive chip 50 may transmit the control signal to all first switch units 51, thereby controlling all first switch units 51 to be conducting or cutoff. When performing the module detection, the drive chip 50 may transmit the control signal to all first switch units 51 to control one first switch unit 51 to be conductive and other first switch units 51 to be cutoff. Since the first and second electrodes of the first switch unit 51 are respectively connected to a conductive pad 35 and a signal wire at the first substrate 10, when the first switch unit is conducting, the conductive pad 35 may be electrically connected to one signal wire at the first substrate 10, which may enable the signal on the conductive pad 35 and the signal on the signal wire forming the electrical connection with the conductive pad 35 to be the same. The signal on the signal wire forming the electrical connection with the conductive pad 35 may be obtained by detecting the signal on the conductive pad 35, thereby implementing the detection of the signal on the signal wire at the first substrate 10. When products do not function properly in use, signal states on different signal wires may be detected through the conductive pads 35. Therefore, the cause of the abnormality of the products may be determined without disassembling the display module 200.

In an optional embodiment, the signal wires electrically connected to the first switch units 51 may include a clock signal line, a start trigger signal line, a reset signal line, and a constant level signal line.

The display region 40 of the display module 200 may include a plurality of pixel unit rows. Each pixel unit row may be electrically connected to a drive unit of the gate electrode, respectively. The drive unit of the gate electrode may scan pixel units under the control of the start trigger signal line, the clock signal line, and the reset signal line, thereby implementing the display function of the display panel. Furthermore, a constant level signal line, such as a high-level signal line or a low-level signal line, may be disposed at the first substrate 10 of the display module 200, which may be configured to provide a power signal for the pixel units. In the present disclosure, the second electrodes of different first switch units 51 may be electrically connected to the clock signal line, the start trigger signal line, the reset signal line, and the constant level signal line, respectively; when one first switch unit 51 electrically connected to such signal wires is conducting, the signal states of the clock signal line, the start trigger signal line, the reset signal line, and the constant level signal line may be detected through the conductive pad 35, thereby implementing the detection of the signals on such signal wires.

In an optional embodiment, referring to FIG. 10, the drive chip 50 may include second control terminals 62 having a same quantity as the pad regions 33. The gate electrodes of all second switch units 52 electrically connected to the conductive pads 35 in a same pad region 33 may be connected to a same second control terminal 62. The gate electrodes of all second switch units 52 electrically connected to the conductive pads 35 in different pad regions 33 may be connected to different second control terminals 62.

For example, referring to FIG. 10, two pad regions 33 may be disposed in the display module 200 and also respectively disposed on two sides of the binding region 32; and two pad regions 33 may respectively include the plurality of conductive pads 35. In the viewing angle shown in FIG. 10, the gate electrodes of the second switch units 52 electrically connected to the conductive pads 35 in a left pad region 33 may be connected to a same second control terminal 62 at the drive chip 50, and the gate electrodes of the second switch units 52 electrically connected to the conductive pads 35 in a right pad region 33 may be connected to another second control terminal 62 at the drive chip 50. At the electrostatic conduction stage, two second control terminals 62 may simultaneously transmit control signals to the second switch units 52 electrically connected to two second control terminals, which may enable all second switch units 52 to be conducting, thereby electrically connecting all conductive pads 35 in the same pad region 33 for transmitting static electricity. When two second control terminals 62 are included in the drive chip 50, two second control terminals 62 may be respectively disposed at two ends of the drive chip 50 and may be respectively adjacent to the second switch unit groups 42, which may simplify the wiring complexity in the display module 200 and the production process of the display module 200.

Figure 11:
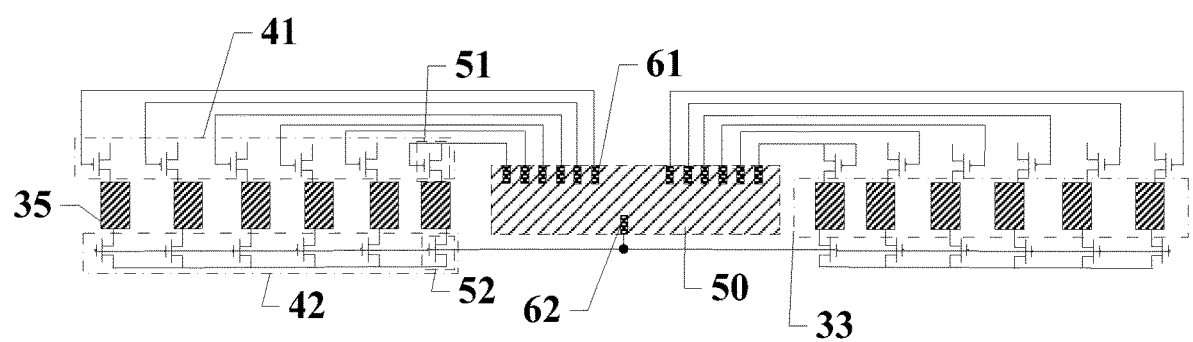
FIG. 11 illustrates a connection schematic between a drive chip and a first switch unit group according to the embodiments of the present disclosure.

In an optional embodiment, FIG. 11 illustrates the connection schematic between the drive chip 50 and the first switch unit group 41 in the display module 200 according to the embodiments of the present disclosure. The drive chip 50 may include one second control terminal 62, and the gate electrodes of all second switch units 52 electrically connected to all conductive pads 35 may be connected to the second control terminal 62.

For example, referring to FIG. 11, two pad regions 33 may be disposed in the display module 200 and also respectively disposed on two sides of the binding region 32; and two pad regions 33 may respectively include the plurality of conductive pads 35. One second control terminal 62 may be disposed at the drive chip 50 in the display module 200 provided in one embodiment. In the viewing angle shown in FIG. 11, the gate electrodes of the second switch units 52 electrically connected to the conductive pads 35 in the left pad region 33 and the gate electrodes of the second switch units 52 electrically connected to the conductive pads 35 in the right pad region 33 may all be connected to the second control terminal 62 at the drive chip 50. At the electrostatic conduction stage, the second control terminal 62 at the drive chip 50 may simultaneously transmit control signals to the gate electrodes of the second switch units 52 corresponding to two pad regions 33, which may enable all second switch units 52 to be conducting, thereby electrically connecting all conductive pads 35 in the same pad region 33 for transmitting static electricity. When only one second control terminal 62 is included in the drive chip 50, it is beneficial to reduce the quantity of the control terminals at the drive chip 50, thereby simplifying the control time sequence of the drive chip.

In an optional embodiment, referring to FIG. 9 or FIG. 10, each first switch unit may include one first switch transistor which is a P-type transistor or a N-type transistor; and each second switch unit may include one second switch transistor which is the P-type transistor or the N-type transistor.

For example, in the display module 200 provided in the embodiments of the present disclosure, optionally, each first switch transistor in the first switch unit 51 may be the P-type transistor or the N-type transistor; and optionally, each second switch transistor in the second switch unit 51 may be the P-type transistor or the N-type transistor. The P-type transistor may be a PMOS (p-type metal-oxide-semiconductor) transistor, and the N-type transistor may be an NMOS (n-type metal-oxide-semiconductor) transistor or an oxide thin film transistor. The P-type transistor may be conducting under the control of a low-level signal and be cutoff under the control of a high-level signal. The N-type transistor may be conducting under the control of a high-level signal and be cutoff under the control of a low-level signal. In practical applications, the types of the first switch transistor and the second switch transistor may be selected according to requirements. The gate electrodes of the first switch transistors are electrically connected to different first control terminals 61 at the drive chip 50 respectively and are controlled by the first control terminals 61, such that the types of the first switch transistors in the first switch units 51 may be designed to be same or different.

In an optional embodiment, for the display module 200 provided in the present disclosure, the types of the second switch transistors in the second switch units 52 may be the same. For example, all second switch transistors may be the P-type in the embodiment shown in FIG. 10. Since the second switch transistors in the second switch units 52 may be conducting or cutoff simultaneously, when the types of the second switch transistors in the second switch units 52 are configured to be the same in the present disclosure, a same control signal may be used to control the conducting or cutoff of the second switch transistors simultaneously, which may be advantageous to simplify the control time sequence of the drive chip 50. Furthermore, when the types of the second switch transistors are configured to be the same, the plurality of second switch transistors electrically connected to the conductive pads 35 in a same pad region may be fabricated in a same production process, which may be advantageous to simplify the production process of the display module 200 and improve the production efficiency of the display module 200.

In an optional embodiment, the types of all first switch transistors and all second switch transistors provided in the embodiments of the present disclosure may be the same. For example, all first switch transistors and all second switch transistors may be the P-type in the embodiment shown in FIG. 9 or FIG. 10. In such way, all first switch transistors and all second switch transistors may be fabricated in a same production process, which may be advantageous to further simplify the production process of the display module 200. The first switch transistors and the second switch transistors may be fabricated in the same production process simultaneously, such that it may be more advantageous to improve the production efficiency of the display module 200.

Figure 12:
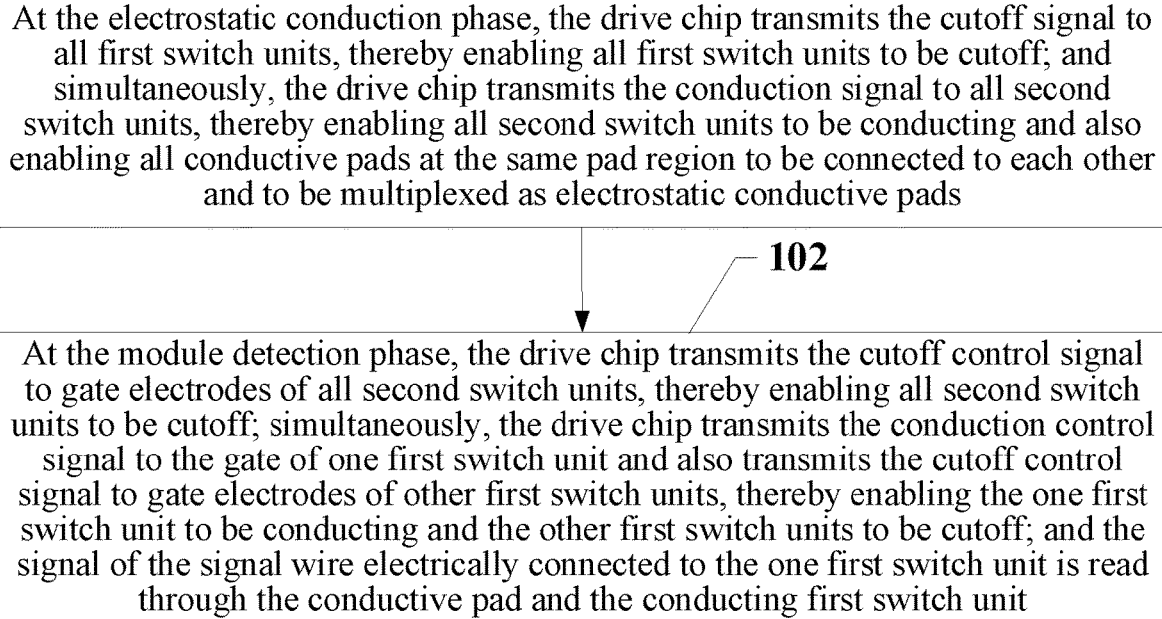
FIG. 12 illustrates a flow chart of a control method of a display module according to the embodiments of the present disclosure.

Based on the same inventive concept, the present disclosure further provides a control method of the display module 200. FIG. 12 illustrates the flow chart of the control method of the display module 200 according to the embodiments of the present disclosure. The control method may include a control method at an electrostatic conduction phase.

Referring to step 101, at the electrostatic conduction phase, the drive chip 50 may transmit a cutoff signal to all first switch units 51, thereby enabling all first switch units 51 to be cutoff; meanwhile, the drive chip 50 may transmit a conduction signal to all second switch units 52, thereby enabling all second switch units 52 to be conducting, and all conductive pads 35 at the same pad region 33 to be connected to each other and to be multiplexed as the electrostatic conductive pads.

For example, referring to FIGS. 5-6, in the control method of the display module 200 provided in the embodiments of the present disclosure, the conductive pads 35 at the first substrate 10 may be multiplexed as the electrostatic conduction pads, and all second switch units 52 may be conducting at the electrostatic conduction phase. Since the second terminals of all second switch units 52 electrically connected to the conductive pads 35 in a same pad region 33 are connected, when the second switch units 52 are conducting, the conductive pads 35 at the same pad region 33 may be electrically connected to each other, thereby forming an equipotential integrated structure for transmitting static electricity. That is, the electrostatic conductive pads may not be required to be separately disposed at the first frame region 31 for the display module 200, and the conductive pads 35 at the first frame region 31 may be multiplexed as the electrostatic conductive pads. Therefore, the space occupied by the static conductive pads separately disposed at the first frame region 31 may be saved, which may be advantageous to further reduce the frame region while implementing reliable electrostatic conduction and be more advantageous to implement the narrow frame design.

In an optional embodiment, referring to FIG. 12, the control method further includes a control method at a module detection phase.

Referring to step 102, at the module detection phase, the drive chip 50 may transmit the cutoff control signal to the gate electrodes of all second switch units 52, thereby enabling all second switch units 52 to be cutoff; meanwhile, the drive chip 50 may transmit the conduction control signal to the gate of one first switch unit 51 and also transmit the cutoff control signal to the gate electrodes of other first switch units 51, thereby enabling one first switch unit 51 to be conducting and other first switch units 51 to be cutoff; and the signal of the signal wire electrically connected to the first switch unit 51 may be read through the conductive pad 35 and the conducting first switch unit 51.

For example, the module detection phase may be performed, for example, in the situation where a product fails. When performing the module detection, the drive chip 50 may transmit the control signal to all first switch units 51 to control one first switch unit 51 to be conductive and other first switch units 51 to be cutoff. Since the first and second electrodes of the first switch unit 51 are respectively connected to a conductive pad 35 and a signal wire at the first substrate 10, when the first switch unit is conducting, the conductive pad 35 may be electrically connected to one signal wire at the first substrate 10, which may enable the signal on the conductive pad 35 and the signal on the signal wire forming the electrical connection with the conductive pad 35 to be the same. The signal on the signal wire forming the electrical connection with the conductive pad 35 may be obtained by detecting the signal on the conductive pad 35, thereby implementing the detection of the signal on the signal wire at the first substrate 10. When products do not function properly in use, signal states on different signal wires may be detected through the conductive pads 35. Therefore, the cause of the abnormality of the product may be determined without disassembling the display module 200.

It should be noted that the display substrate and display module provided in the embodiments of the present disclosure may be applied to any product or component having a display function, such as a mobile phone, a tablet computer, a television, a display, a notebook computer, a digital photo frame, a navigator, and the like.

From the above-mentioned embodiments, it can be seen that the display substrate, the display module and the control method thereof provided by the present disclosure may achieve at least the following beneficial effects.

In the display substrate, the display module and the control method thereof provided in the present disclosure, the first frame region of the display substrate may include the binding region and the pad region. The display substrate may include the first substrate and the second substrate, which are opposite to each other. The first substrate may include the plurality of conductive pads disposed at the side of the base substrate facing the second substrate, where the conductive pads may be at the pad region. The present disclosure provides the first switch unit group which may be respectively connected to the conductive pads and the signal wires in the first substrate, and also provides the second switch unit group which may be connected to the conductive pads. When the first switch unit group is conducting and the second switch unit group is cutoff, the conductive pads may be used to input the first detection signal to the substrate to implement the substrate detection. When the second switch unit group is conducting and the first switch unit group is cutoff, the conductive pads at the same pad region may be connected with each other to be multiplexed as electrostatic conductive pads, thereby conducting out static electricity in the display substrate and the display module. In such way, the electrostatic conductive pads may not be required to be separately disposed at the first frame region of the display substrate, and the conductive pads of the pad region on the display substrate may be multiplexed as the electrostatic conductive pads. Therefore, the space of the first frame region may be efficiently utilized and saved, and the width of the first frame region may be further reduced while the substrate detection and the electrostatic conduction are implemented, which may be more advantageous to implement the narrow frame design of the display substrate.

Although the embodiments of the present disclosure have been described in detail through examples, those skilled in the art should understand that the above-mentioned examples may merely for illustration and may not be intended to limit the scope of the present disclosure. Those skilled in the art should understand that the above-mentioned embodiments may be modified without departing from the scope and spirit of the present disclosure, and the scope of the disclosure may be determined by the scope of the appended claims.

What is claimed is:

1. A display substrate, comprising:
a display region and a non-display region surrounding the display region, wherein:
the non-display region includes a first frame region;
the first frame region includes a binding region and a pad region; and
the pad region is at least at one side of the binding region along a first direction; and
a first substrate and a second substrate opposite to the first substrate, wherein the first substrate includes:
a base substrate;
a plurality of conductive pads disposed at a side of the base substrate facing the second substrate, wherein the plurality of conductive pads is at the pad region;
a first switch unit group at the first frame region, wherein the first switch unit group includes a plurality of first switch units, first terminals of all first switch units are electrically connected to all conductive pads in a one-to-one correspondence respectively, and second terminals of all first switch units are electrically connected to different signal wires in the first substrate respectively; and
a second switch unit group at the first frame region, wherein the second switch unit group includes a plurality of second switch units, first terminals of all second switch units are electrically connected to all conductive pads in a one-to-one correspondence respectively, and second terminals of all second switch units electrically connected to the conductive pads at a same pad region are connected with each other; and wherein at a substrate detection phase:
a conduction signal is provided to gates of all first switch units and a cutoff signal is provided to gates of all second switch units, by an external detection device, thereby enabling all second switch units to be cutoff and all first switch units to be conducting; and
the display substrate is configured to receive a first detection signal inputted by the external detection device through the conductive pads and all first switch units.

2. The display substrate according to claim 1, wherein:
pad regions are at two sides of the binding region along the first direction, and the conductive pads are symmetrically disposed at two sides of the binding region along the first direction.

3. The display substrate according to claim 1, wherein:
the first switch unit group and the second switch unit group are respectively at two sides of the conductive pads along a second direction, wherein the first direction intersects the second direction.

4. A display module, comprising:
a display substrate, comprising:
a display region and a non-display region surrounding the display region, wherein:
the non-display region includes a first frame region;
the first frame region includes a binding region and a pad region; and
the pad region is at least at one side of the binding region along a first direction; and
a first substrate and a second substrate opposite to the first substrate, wherein the first substrate includes:
a base substrate;
a plurality of conductive pads disposed at a side of the base substrate facing the second substrate, wherein the plurality of conductive pads is at the pad region;
a first switch unit group at the first frame region, wherein the first switch unit group includes a plurality of first switch units, first terminals of all first switch units are electrically connected to all conductive pads in a one-to-one correspondence respectively, and second terminals of all first switch units are electrically connected to different signal wires in the first substrate respectively; and
a second switch unit group at the first frame region, wherein the second switch unit group includes a plurality of second switch units, first terminals of all second switch units are electrically connected to all conductive pads in a one-to-one correspondence respectively, and second terminals of all second switch units electrically connected to the conductive pads at a same pad region are connected with each other; and
wherein at a substrate detection phase:
a conduction signal is provided to gates of all first switch units and a cutoff signal is provided to gates of all second switch units, by an external detection device, thereby enabling all second switch units to be cutoff and all first switch units to be conducting; and
the display substrate is configured to receive a first detection signal inputted by the external detection device through the conductive pads and all first switch units; and a drive chip and a conductive structure, wherein:
the drive chip is bound to the binding region;
the second substrate includes an electrostatic shielding layer electrically connected to the conductive pads through the conductive structure; and
wherein at an electrostatic conduction phase:
the conductive pads are multiplexed as electrostatic conduction pads, all first switch units are cutoff, all second switch unit are conducting, and all conductive pads at the same pad region are connected with each other.

5. The display module according to claim 4, wherein:
the conductive structure includes one conductive structure and the pad region includes one pad region; and an orthographic projection of the conductive structure on a plane of the base substrate respectively overlaps orthographic projections of all conductive pads in the pad region on the plane of the base substrate.

6. The display module according to claim 5, wherein:
the orthographic projection of the conductive structure on the plane of the base substrate covers the orthographic projections of all conductive pads in the pad region on the plane of the base substrate.

7. The display module according to claim 4, wherein:
the conductive structure includes two conductive structures and the pad region includes two pad regions;
the two pad regions are at two sides of the binding region along the first direction; and
the two conductive structures and the two pad regions are disposed in a one-to-one correspondence, and an orthographic projection of one conductive structure on a plane of the base substrate respectively overlaps orthographic projections of all conductive pads in the pad region corresponding to the one conductive structure on the plane of the base substrate.

8. The display module according to claim 4, wherein:
the conductive structure is a colloid doped with conductive particles.

9. The display module according to claim 8, wherein:
the conductive particles include silver or copper.

10. The display module according to claim 4, wherein:
the drive chip includes a plurality of first control terminals, and gate electrodes of all first switch units are electrically connected to first control terminals in a one-to-one correspondence; and
at a module detection phase of the display module,
the drive chip, through the first control terminals, is configured to transmit a conduction control signal to a gate electrode of one first switch unit and also transmits a cutoff control signal to gate electrodes of other first switch units, which enables the one first switch unit to be conducting and the other first switch units to be cutoff; and
a signal of a signal wire electrically connected to the one first switch unit is read through a conductive pad and a conducting first switch unit.

11. The display module according to claim 10, wherein:
the signal wire electrically connected to the one first switch unit includes a clock signal line, a start trigger signal line, a reset signal line, and a constant level signal line.

12. The display module according to claim 4, wherein:
the drive chip includes a second control terminal having a same quantity as the pad region;
gate electrodes of all second switch units electrically connected to the conductive pads in a same pad region are connected to a same second control terminal; and
gate electrodes of all second switch units electrically connected to the conductive pads in different pad regions are connected to different second control terminals.

13. The display module according to claim 4, wherein:
the drive chip includes one second control terminal, and gate electrodes of all second switch units electrically connected to all conductive pads are connected to the one second control terminal.

14. The display module according to claim 4, wherein:
each first switch unit includes one first switch transistor which is a P-type transistor or a N-type transistor, and each second switch unit includes one second switch transistor which is the P-type transistor or the N-type transistor.

15. The display module according to claim 14, wherein:
types of all second switch transistors in the second switch units are same.

16. The display module according to claim 14, wherein:
types of all first switch transistors and all second switch transistors are same.

17. A control method of a display module, comprising:
providing the display module, comprising a display substrate, a drive chip, and a conductive structure,
the display substrate, comprising:
a display region, a non-display region surrounding the display region, a first substrate, and a second substrate opposite to the first substrate, wherein:
the non-display region includes a first frame region;
the first frame region includes a binding region and a pad region; and the pad region is at least at one side of the binding region along a first direction;
the first substrate includes a base substrate; a plurality of conductive pads disposed at a side of the base substrate facing the second substrate, wherein the plurality of conductive pads is at the pad region; a first switch unit group at the first frame region, wherein the first switch unit group includes a plurality of first switch units, first terminals of all first switch units are electrically connected to all conductive pads in a one-to-one correspondence respectively, and second terminals of all first switch units are electrically connected to different signal wires in the first substrate respectively; and a second switch unit group at the first frame region, wherein the second switch unit group includes a plurality of second switch units, first terminals of all second switch units are electrically connected to all conductive pads in a one-to-one correspondence respectively, and second terminals of all second switch units electrically connected to the conductive pads at a same pad region are connected with each other; and
wherein the drive chip is bound to the binding region;
the second substrate includes an electrostatic shielding layer electrically connected to the conductive pads through the conductive structure; and
at an electrostatic conduction phase:
the drive chip transmitting a cutoff signal to all first switch units, thereby enabling all first switch units to be cutoff; and
simultaneously, the drive chip transmitting a conduction signal to all second switch units, thereby enabling all second switch units to be conducting and also enabling all conductive pads at the same pad region to be connected to each other and to be multiplexed as electrostatic conductive pads.

18. The control method according to claim 17, further including:
- a module detection phase, wherein:
  - at the module detection phase, the drive chip transmits a cutoff control signal to gate electrodes of all second switch units, thereby enabling all second switch units to be cutoff;
  - simultaneously, the drive chip transmits a conduction control signal to a gate of one first switch unit and also transmits the cutoff control signal to gate electrodes of other first switch units, thereby enabling the one first switch unit to be conducting and the other first switch units to be cutoff; and
  - a signal of a signal wire electrically connected to the one first switch unit is read through a conductive pad and a conducting first switch unit.

\* \* \* \* \*